United States Patent [19]

Loh et al.

[11] Patent Number: 5,599,575
[45] Date of Patent: Feb. 4, 1997

[54] PROCESS FOR THE PRODUCTION OF CREAMED COCONUT AND CREAMED COCONUT PRODUCT

[75] Inventors: Jimbay P. Loh, Peekskill; Jerome F. Trumbetas, Tarrytown, both of N.Y.; Jocelyn Q. Mendoza, Cordova, Tenn.

[73] Assignee: Kraft Foods, Inc., Northfield, Ill.

[21] Appl. No.: 410,267

[22] Filed: Mar. 24, 1995

[51] Int. Cl.⁶ ........................................... A23L 1/221
[52] U.S. Cl. ........................ 426/617; 426/489; 426/615; 426/650; 426/656
[58] Field of Search ........................... 426/617, 518, 426/533, 489, 650, 615, 656

[56] References Cited

U.S. PATENT DOCUMENTS

| | | | |
|---|---|---|---|
| 2,079,030 | 5/1937 | Northcutt | 426/617 |
| 2,147,751 | 2/1939 | Northcutt | 426/617 |
| 3,140,953 | 7/1964 | Roberts | 426/617 |
| 3,573,064 | 3/1971 | Noznick et al. | 426/617 |
| 3,860,725 | 1/1975 | Forkner | 426/617 |
| 3,899,606 | 8/1975 | Forkner | 426/617 |
| 4,098,912 | 7/1978 | Ignacio et al. | 426/617 |
| 4,296,136 | 10/1981 | Ziccarelli et al. | 426/617 |

*Primary Examiner*—Esther Kepplinger
*Assistant Examiner*—Lien Tran
*Attorney, Agent, or Firm*—Thomas A. Marcoux; Thomas R. Savoie

[57] ABSTRACT

A process for the production of a creamed coconut product, which process comprises the step of milling a coconut-containing product having an average particle size of 50–700 μm, a moisture content of less than 10% by weight, based on the total weight of the coconut-containing product, and a fat content of at least 50% by weight, based on the total weight of the coconut-containing product; at a temperature of from 48° C.–60° C. for a sufficient time to produce a creamed coconut product which contains substantially no coconut particles with a particle size greater than 30 μm. Also disclosed is a creamed coconut product having substantially no coconut particles of a size in excess of 30 μm, which product may be made by the process of the invention. The creamed coconut product has an excellent storage stability and improved organoleptic characteristics.

21 Claims, No Drawings

PROCESS FOR THE PRODUCTION OF CREAMED COCONUT AND CREAMED COCONUT PRODUCT

BACKGROUND OF THE INVENTION

The present invention relates generally to the processing of coconut-containing products and to edible creamed coconut products resulting from the same.

Coconut milk and coconut cream are used as a flavor base in many Eastern culinary preparations in ways comparable to the manner in which dairy cream, butter and cheese are used in the west. Examples of such foods are Indian and Thai curries which employ coconut milk and/or coconut cream extensively as a flavor base, as well as coconut drinks which are popular in China. Dairy-based products are in a very limited supply in the east and are cost-prohibitive. Coconut milk and coconut cream are available and represent an alternative.

Conventionally, coconut milk and coconut cream are prepared by extracting liquid from coconut meat. Coconut milk and coconut cream can also be produced by adding water to dessicated coconut and then expressing the liquid out. However, the quickest, easiest, most economical and most desirable way to produce coconut milk and coconut cream is to add water to creamed coconut (coconut concentrate). Depending on the desired fat content, one unit of creamed coconut when diluted with hot water will typically produce 1.5–3.5 units of coconut cream or from 4–11.5 units of coconut milk.

The existing, commercially available creamed coconut product is made by milling dessicated coconut into relatively fine particles having an average particle size of about 100 microns. The milled particles are subsequently cooled like a shortening for ease of handling. This creamed coconut product typically has a moisture content of 1.5–3.5 percent, and a fat content of 61–71 percent.

An example of the preparation of a creamed coconut product can be found in U.S. Pat. No. 2,147,751 which describes a process for preparing a coconut paste having a moisture content of up to 9 percent and a particle size of less than 1500 microns. The product is made by grinding coconut meat containing less than 9 percent water at a temperature of 75–145° F. in, for example, a hammer mill rotating at 3000–3600 r.p.m.. The resultant product is a free flowing mass having a consistency much like white chocolate. This product can be diluted with water to produce coconut milk.

The primary problem with the commercially available creamed coconut product is that when it is diluted to provide coconut milk or coconut cream, the resulting product is not as smooth as aseptically canned, or conventionally made coconut milk or coconut cream. In particular, an unpleasant gritty note is detected at the back of the tongue once the product is swallowed. This unpleasant characteristic is even more noticeable at high water dilutions. The same observation is made when creamed coconut is used as a flavor base to prepare background syrups for frozen desserts as well as for the preparation of cream centers for confectionery applications and fillings for bakery applications.

U.S. Pat. No. 3,573,064 discloses a reconstitutable dry coconut powder which is made by grinding coconut meat to a particle size of not greater than 200 microns in the presence of enough water to reduce the solids content of the coconut meat to 20–99%. After grinding, the fibrous material is removed from the liquid portion, which liquid portion is described as coconut milk. The coconut milk has a particle size of coconut of 30 microns or less. This is said to be important to eliminate physical detection of cellulose by oral detection or mouth feel. To the coconut milk is added an emulsifier and a protein and the mixture is homogenized to obtain maximum fat particle size reduction. The coconut milk usually has a 16–22% total solids content. Finally, the milk is dried to obtain a powdered coconut product. This dried product is said to provide coconut milk with emulsion stability and fresh coconut taste when reconstituted with water.

U.S. Pat. No. 4,296,136 also relates to a reconstitutable natural coconut flavor and a method for producing that flavor. This patent refers to the product of U.S. Pat. No. 3,573,064 and says that while that process produces a powdered coconut flavor, during storage of the powder, an unwanted "soapy-like" taste may develop. Accordingly, U.S. Pat. No. 4,296,136 is directed to overcoming this problem.

U.S. Pat. No. 4,296,136 produces coconut powder by grinding coconut meat to a particle size of 200–1000 microns to rupture the fibers and expel the flavors contained therein, removing all but up to 2 percent by weight of the coconut fiber, heat treating the liquor and concentrating the material to a liquid containing greater than 25 percent solids, or a free-flowing powder. This patent indicates that it is undesirable to retain fiber in the product since fiber imparts a somewhat chewy and tough characteristic to the composition.

Finally, U.S. Pat. No. 2,079,030 is directed to the provision of a light, fluffy coconut powder which is readily mixable with water. In the process for making this powder, an amount of water equal to 1–2 times the weight of the coconut is added to fresh coconut to form a product which is then ground and agitated to produce a pulpy mass which can be passed through a 60-mesh (250 micron) screen. The pulp is then dried to provide a light, fluffy mass. The grinding and crushing may be performed by any suitable means such as a hammer-mill, plate-mill, or ball-mill.

The *Kirk-Othmer Encyclopedia of Chemical Technology*, 1985 Edition, under the heading, "Size Reduction" includes a figure which shows the typical feed and product sizes for common comminution devices. For example, a hammer mill will typically produce products having a particle size on the order of 1000 microns and a roller mill typically gives particle sizes on the order of 100 microns. Thus, it can be seen from this that the prior art comminuting techniques generally will not provide coconut products having very small particles sizes on the order of 10 microns.

U.S. Pat. No. 2,079,030 also teaches that if the grinding is too fine, for instance so fine that the particles of the ground mass approach colloidal size, the resulting powder will not be fluffy, but will be heavy and compact and will not have the advantage of the fluffy powder. Accordingly, this patent suggests that coconut should not be ground to very small particle sizes.

Despite the existence of all of the foregoing products, there remains a need in the art for a concentrated coconut product (creamed coconut) which does not suffer from the aforementioned disadvantages of the prior art products.

SUMMARY OF THE INVENTION

It is the primary object of the present invention to provide a creamed coconut product which is smooth, creamy and which does not give an unpleasant oral sensation when swallowed.

It is a still further object of the present invention to provide a creamed coconut product having a very low moisture content such that the consumer is only paying for coconut and not for extra water.

Still, another object of the present invention is to provide creamed coconut product which has a much longer shelf-life than aseptically packaged products.

It is still another object of the present invention to provide a creamed coconut product which is highly flexible so that it can be easily formulated for a variety of applications including sauces, dips, fillings, chocolates, soft drinks and other products which may require a variety of moisture contents.

It is yet another object of the present invention to provide creamed coconut which is easy to handle, transport and store.

In general, the process of the present invention involves the step of milling a coconut-containing product having an average particle size of 50–700 microns, a moisture content of less than 10 percent by weight and a fat content of at least 50 percent by weight at a temperature of from 48–60° C. long enough to obtain a creamed coconut product containing substantially no coconut particles with a particle size greater than 30 microns.

The creamed coconut product of the invention which may be obtained from the above process comprises finely-divided coconut wherein substantially all coconut particles have a particle size of less than 30 microns, has a fat content of at least 50 percent by weight and a water content of up to 10 percent by weight, both based on the total weight of the creamed coconut product. This creamed coconut product may be incorporated in a variety of other food products as well as diluted to provide coconut cream and/or coconut milk.

Additional objects and features of the invention will be apparent from the following detailed description in which the preferred embodiments are set forth in detail.

DETAILED DESCRIPTION OF THE PREFERRED EMBODIMENTS

The present invention provides a process for the production of a creamed coconut product, which process comprises the step of milling a coconut-containing product. The coconut-containing product which may be milled in accordance with the process of the present invention typically has an average particle size of 50–700 µm and a moisture content of less than 10 percent by weight, based on the total weight of the coconut-containing product. This relatively low moisture content is required since otherwise the coconut solids will expand or swell making it difficult or impossible to grind the resultant solid mass. Any type of coconut material may be employed as long as it meets the foregoing criteria. For example, coconut meat or coconut cream can be employed as the starting material. In addition, it is not necessary to modify the composition of the coconut meat, such as by removing fibrous material, prior to employing it in the process of the invention.

The starting coconut-containing product is preferably pre-ground to an average particle size of 50–700 microns and, more preferably, 100–300 microns. This is required since otherwise the milling step of the present invention will not be capable of achieving the small particle sizes required. Thus, when starting from coconut meat, it may be necessary to pregrind the coconut meat before feeding it to the milling step of the present invention. Such pregrinding can be accomplished in any suitable, conventional manner such as by using a hammer mill or a roll mill.

In order to obtain good milling in the milling step of the process, the coconut containing material fed to the mill should have a fat content of at least 50 percent by weight, based on the total weight of the composition. More preferably, the fat content should be at least 60 percent by weight and, most preferably, between 65–75 percent by weight, based on the total weight of the composition. The fat content contributes to the pasty nature of the final product and makes it possible to dilute the final product to produce coconut cream and/or coconut milk without requiring the addition of fat.

During the milling step, the temperature should be maintained in the range of 48–60° C. The lower end of the temperature range corresponds to the melting point of the fat in the coconut-containing material. The upper end of the temperature range is chosen to prevent negative effects on the organoleptic qualities of the material due to heat effects. The temperature may be maintained by preheating the coconut-containing material and/or fat fed to the mill. It is also possible to envelope the mill in a heating jacket in order to maintain the required temperature.

Grinding of the coconut-containing material is continued until there remain substantially no coconut particles having a diameter in excess of 30 microns. More preferably, grinding is continued until there are substantially no coconut particles having a diameter in excess of 20 microns. The preferred creamed coconut product of the present invention has an average particle size of 1–15 microns and comprises substantially no particles with a particle size greater than 20 microns.

Milling can be accomplished in conventional milling apparatus known for grinding to the appropriate particle size. For example, a high efficiency ball mill is a preferred apparatus. Such a ball mill is generally operated at a pressure of less than 1 bar, and more preferably at approximately 0.5 bar. The balls of the high efficiency ball mill typically have a diameter of 0.7–5 millimeters and are made from a material approved for food contact and selected from glass, ceramic or stainless steel. In a more preferred embodiment, the balls of the high efficiency ball mill have a diameter of 2–3 millimeters.

The creamed coconut product obtained from the mill is then cooled to room temperature whereby a concentrated form of coconut is obtained. The resultant product is typically a pasty material.

The creamed coconut product of the present invention comprises finely-divided coconut wherein substantially all of the coconut particles have a particle size of less than 30 µm. More preferably, substantially all of the particles of the finely-divided coconut in the creamed coconut product have a particle size of less than 20 µm. Even more preferably, the particles of finely-divided coconut in the creamed coconut product have an average particle size of 1–15 µm.

The creamed coconut product will typically have a fat content in excess of 50% by weight, and more preferably in excess of 60% by weight. This fat content makes the product a paste which facilitates handling of the product. Further, this fat content allows preparation of coconut cream and coconut milk products by simple dilution of the creamed coconut without having to add additional coconut fat thereto. Of course, it is possible to reduce the fat content of the creamed coconut product by any suitable conventional means, if desirable for a low fat product, for example.

The water content of the creamed coconut product is below 10% by weight, more preferably below 5% by weight and most preferably in the range of 1–5% by weight. The low water content of the creamed coconut product has a positive influence on the storage stability. Further, it provides additional flexibility in the formulation of the product since one need not take the water into account as would be the case when flavoring with coconut milk. Also, the consumer has the advantage that the product is substantially comprised of coconut product and does not contain a large amount of inert material such as water and thus the consumer gets more coconut flavor for his money.

Another important advantage of the creamed coconut of the present invention is that it may contain a significant fraction of coconut product derived from coconut fiber. This is important since many prior art products are prepared by a process which requires an additional step to separate coconut fiber from the product in order to obtain a product with acceptable organoleptic characteristics. The present product, however, can be made from coconut fiber-containing material and thus this additional separation step can be omitted from its preparation. In fact, the preferred creamed coconut of the present invention is derived directly from coconut meat without separating any fraction of the meat and thus will contain at least 2% by weight of material derived from coconut fiber and perhaps significantly more.

Yet another significant advantage of the product of the present invention is its flexibility in formulation. Since the product is a concentrated form of coconut, it is very easily formulated for a variety of applications. These applications include the production of coconut cream and coconut milk, as well as in sauces, food recipes, dips, fillings, chocolate centers, soft drinks and other products requiring a coconut flavoring. For example, one unit of the creamed coconut product can be diluted with, for example, 0.5 to 2.5 units of water to produce 1.5–3.5 units of coconut cream. One unit of creamed coconut may also be diluted with, for example, 3 to 10.5 units of water in order to obtain 4–11.5 units of coconut milk.

Coconut milk and coconut cream are used as a flavor base in many eastern food preparations and thus the present product, when diluted, can be used in a variety of products, including soft drinks, sauces, dips, fillings, confectionery products and other products requiring coconut flavoring.

The product of the present invention also exhibits the advantage that since it is a concentrated product, it is much easier to handle and requires less storage space than the corresponding coconut cream and coconut milk products. Thus, smaller tankers and trucks may be employed to ship the material. Further, since it is a storage stable material, it does not require temperature controlled tankers or special storage tanks, but rather it may be shipped in regular trucks.

Finally, the storage stability of the creamed coconut makes production scheduling simpler because, once a container is opened, the user has up to 12 months to employ the material before it will spoil. Coconut milk and coconut cream, on the other hand, must be used right away or they will spoil. As a result of its storage stability, the creamed coconut product need not be aseptically packaged since it will have a long shelf-life in the form that it is obtained from the mill.

The following examples are presented for the purpose of illustration only and are not to be construed as limiting the invention in any way. The scope of the invention is to be determined from the claim appended hereto.

EXAMPLE 1

To 70 parts coconut oil is added 30 parts coconut fiber having an average particle size of 300 microns to produce a total of 1500 milliliters of material. This mixture is pumped through a Dyno-Mill™ high efficiency ball mill at a temperature of between 48–60° C. to produce a creamed coconut product having an average particle size of 9 microns.

EXAMPLE 2

1500 milliliters of a commercially available coconut cream product having an average particle size of 92 microns was pumped through a Dyno-Mill™ high efficiency ball mill at a temperature of between 48–60° C. and milled until a product was obtained with an average particle size of 9 microns. This creamed coconut product was found to be storage stable and had a very smooth taste which did not give an unpleasant gritty sensation when swallowed.

EXAMPLE 3

The creamed coconut of Example 1 was melted in a steam jacketed kettle with a side scraper agitator at a temperature below 140° F. and diluted with 64.29 percent by weight of water based on the total weight of the composition. The mixture was blended for 10 minutes, pasteurized, homogenized and cooled to produce a coconut milk product having a fat content of about 25% by weight. The resulting milk was found to have good coconut flavor.

EXAMPLE 4

The creamed coconut of Example 1 was melted in a steam jacketed kettle with a side scraper agitator at a temperature below 140° F. To this melt was added carrageenan, glycerol monostearate and water in the amounts specified in Table 1. Finally, the potassium sorbate is added, the mixture is blended for 10 minutes, pasteurized, homogenized and cooled to produce a stabilized coconut milk product having a fat content of about 25% by weight.

TABLE 1

| Ingredient | Weight Percent |
| --- | --- |
| Creamed Coconut | 35.50 |
| Carrageenan (FMC SD-389) | 0.05 |
| Glycerol Monostearate | 0.18 |
| Water | 64.12 |
| Potassium Sorbate | 0.10 |
|  | 100.00 |

EXAMPLE 5—PREPARATION OF CHICKEN MUSHROOM CURRY

The following recipe was employed to prepare a chicken mushroom curry using the coconut milk of Example 4.

TABLE 2

| CHICKEN MUSHROOM CURRY ||
| --- | --- |
| Ingredients | Amounts |
| peanut oil | 4 tablespoons |
| garlic, crushed | 3 cloves |
| yellow or white onions, diced | 1 medium size |
| fresh ginger, finely grated | ½ teaspoon |
| chicken breast, cut in long slices | 1 pound |
| salt | 2 teaspoons |
| curry powder | 1 teaspoon |
| black pepper, ground | ¼ teaspoon |
| coconut milk | 1 cup |
| fresh mushrooms, sliced | 1 pound |
| green onions, diced | ½ cup |
| lemon juice | 2 teaspoons |

Procedure

Heat oil. Saute garlic, onion, ginger and chicken. Add salt, curry powder and pepper. Add the blended coconut milk. Simmer for 5 minutes. Add the mushrooms. Continue cooking until mushrooms are slightly tender. Remove from heat. Stir in green onions and lemon juice. Serve hot with plain white rice.

EXAMPLE 6—PREPARATION OF TROPICAL DIP

The following recipe was employed to prepare a tropical dip using the creamed coconut of example 1.

TABLE 3

| TROPICAL DIP | |
|---|---|
| Ingredients | Amounts |
| Mayonnaise or Salad Dressing | 1 cup |
| Creamed Coconut (melted) | 3 tablespoons |
| Chicken Base | 2 teaspoons |
| red onions, chopped finely | ½ cup |
| canned crushed pineapple | ½ cup |
| fresh parsley, chopped | 1 tablespoon |

Procedure

Blend in bowl, the mayonnaise or salad dressing, melted coconut concentrate, chicken base, onions and pineapples. Mix in gently some of the parsley. Sprinkle the rest of the parsley on top of dip. Serve with cut carrots, broccoli, celery and cauliflower.

The foregoing examples were presented for the purpose of illustration and description only and not to be construed as limiting the invention in any way. The scope of the invention is to be determined from the claims appended hereto.

What is claimed is:

1. A process for the production of a creamed coconut product, which process comprises the step of milling an initial coconut-containing product having an average particle size of 50–700 μm, a moisture content of less than 10% by weight, based on the total weight of the coconut-containing product, and a fat content of at least 50% by weight, based on the total weight of the coconut-containing product; at a temperature of from 48° C.–60° C. to obtain a creamed coconut product which contains substantially no coconut particles with a particle size greater than 30 μm without removing fibrous material from the creamed coconut product.

2. A process as claimed in claim 1 wherein said creamed coconut product comprises at least 2% by weight, based on the total weight of the creamed coconut product, of coconut fiber.

3. A process as claimed in claim 1 wherein the initial coconut-containing product has a an average particle size of 100–300 μm and a moisture content of 1–5% by weight, based on the total weight of the initial coconut-containing product.

4. A process as claimed in claim 1 wherein the initial coconut-containing product has a fat content of at least 60% by weight, based on the total weight of the initial coconut-containing product.

5. A process as claimed in claim 4 wherein the fat content of the initial coconut-containing product is substantially comprised of coconut fat.

6. A process as claimed in claim 1 wherein the milling step is carried out in a high efficiency ball mill at a pressure of less than 1 bar and wherein the balls of the high efficiency ball mill have a diameter of 0.7–5 mm and are made from a material approved for food contact and selected from the group consisting of glass, ceramic or stainless steel.

7. A process as claimed in claim 6 wherein the balls of the high efficiency ball mill have a diameter of 2–3 mm.

8. A process as claimed in claim 2 wherein milling is continued to obtain a creamed coconut product having an average particle size of 1–15 μm and comprises substantially no particles with a particle size greater than 20 μm.

9. A process as claimed in claim 2 wherein the initial coconut-containing product is coconut cream having an average particle size of 50–300 μm, a water content of less than 5% by weight, and a fat content of at least 60% by weight, said fat and water contents being based on the total weight of the coconut cream.

10. A process as claimed in claim 2 wherein the initial coconut-containing product is a mixture of coconut fat with a coconut product selected from the group consisting of coconut meat, coconut fiber and mixtures thereof.

11. A creamed coconut product made by the process of claim 1 which comprises finely-divided coconut wherein substantially all coconut particles have a particle size of less than 30 μm and wherein the creamed coconut has a fat content of at least 50% by weight and a water content of up to 10% by weight, both based on the total weight of the creamed coconut product.

12. A creamed coconut product as claimed in claim 11 which has a fat content of at least 60% by weight, based on the total weight of the creamed coconut product.

13. A creamed coconut product as claimed in claim 12 wherein the fat content of the creamed coconut product is substantially comprised of coconut fat.

14. A creamed coconut product as claimed in claim 11 wherein at least 2% by weight of the solids of the creamed coconut product is derived from coconut fiber.

15. A creamed coconut product as claimed in claim 14 wherein the finely-divided coconut has an average particle size of from 1–15 μm.

16. A creamed coconut product as claimed in claim 15 wherein the finely divided coconut comprises substantially no coconut particles with a particle size greater than 20 μm and the creamed coconut has a water content of from 1–5% by weight, based on the total weight of the creamed coconut product.

17. An edible product which comprises creamed coconut as claimed in claim 11.

18. A finely-divided coconut product which comprises coconut, substantially all of which has a particle size of less than 30 μm, said coconut product having a water content of less than 10% by weight, based on the total weight of the coconut products, a fat content of at least 50% by weight, based on the total weight of the coconut product, and wherein at least 2% by weight of the coconut solids is derived from coconut fiber.

19. A finely-divided coconut product as claimed in claim 18 wherein the average particle size of the coconut is from 1–15 μm and the water content is 1–5% by weight, based on the total weight of the coconut product.

20. A finely-divided coconut product as claimed in claim 19 wherein substantially all of the coconut has a particle size of less than 20 μm.

21. An edible product which comprises creamed coconut as claimed in claim 18.

\* \* \* \* \*